2 Sheets—Sheet 1.

M. M. MONSANTO & T. GANNON.
Apparatus for Concentrating and Crystallizing Saccharine and Other Liquids.

No. 217,702. Patented July 22, 1879.

2 Sheets—Sheet 2.

M. M. MONSANTO & T. GANNON.
Apparatus for Concentrating and Crystallizing Saccharine and Other Liquids.

No. 217,702.      Patented July 22, 1879.

Witnesses.
Chas. Wahlers.
Hugo Brueggemann

Inventors.
Mauricio M. Monsanto
Thomas Gannon
by their attys.
Van Santvoord & Hauff

UNITED STATES PATENT OFFICE.

MAURICIO M. MONSANTO AND THOMAS GANNON, OF JERSEY CITY, N. J.

IMPROVEMENT IN APPARATUS FOR CONCENTRATING AND CRYSTALLIZING SACCHARINE AND OTHER LIQUIDS.

Specification forming part of Letters Patent No. 217,702, dated July 22, 1879; application filed November 29, 1878.

*To all whom it may concern:*

Be it known that we, MAURICIO M. MONSANTO and THOMAS GANNON, both of Jersey City, in the county of Hudson and State of New Jersey, have invented a new and Improved Apparatus for Concentrating and Crystallizing Saccharine and other Liquids, which invention is fully set forth in the following specification, reference being had to the accompanying drawings, in which—

Figure 1:
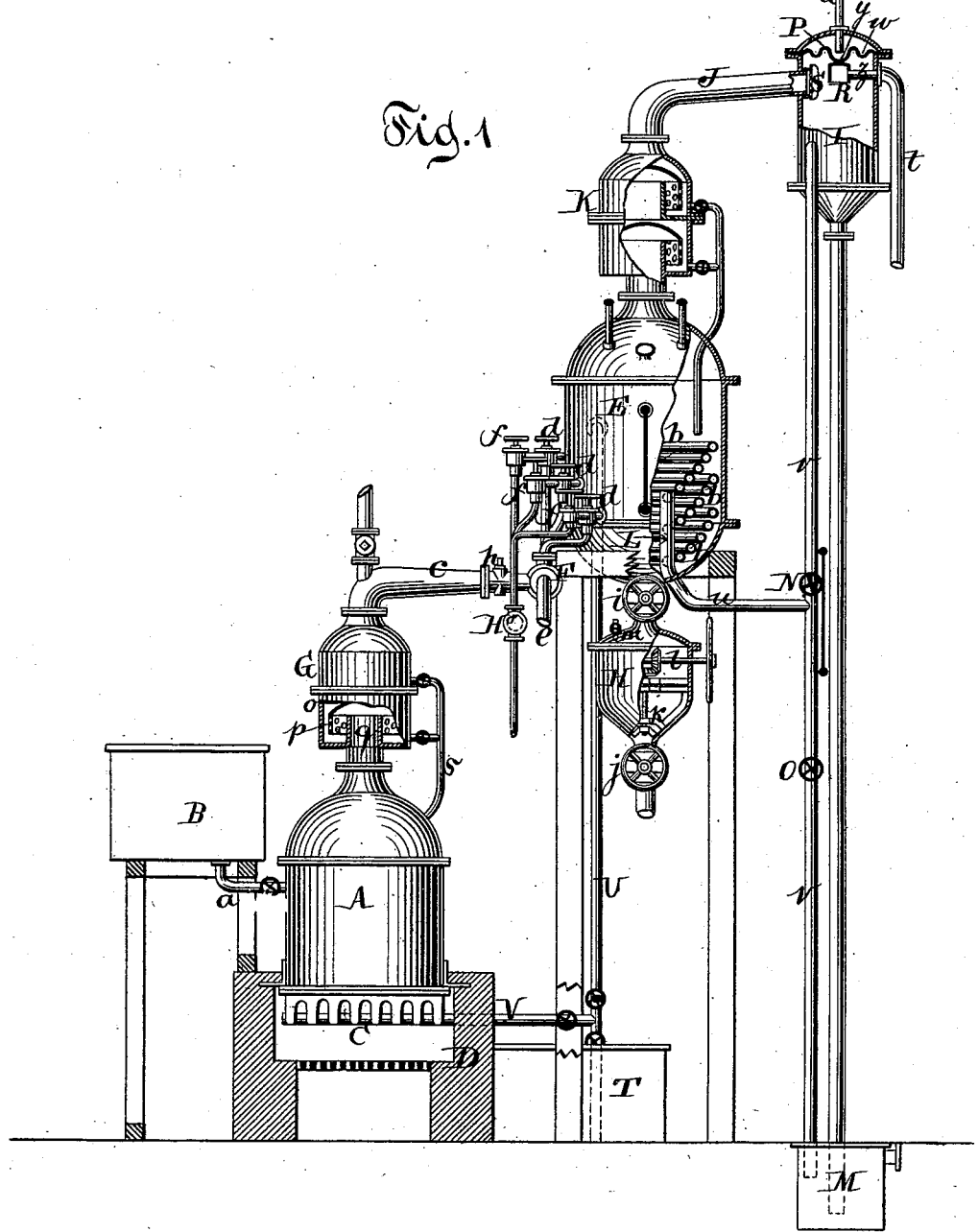
Figure 2:
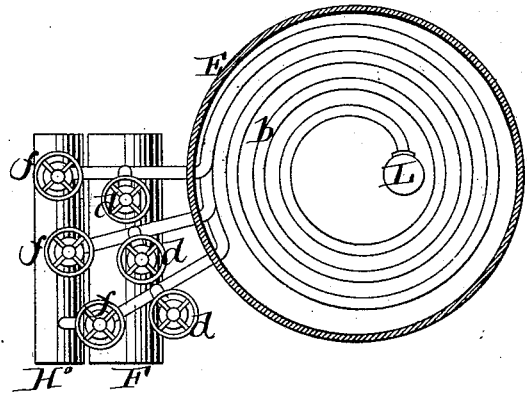
Figure 3:
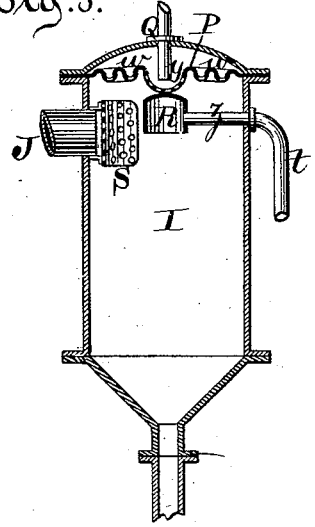
Figure 4:
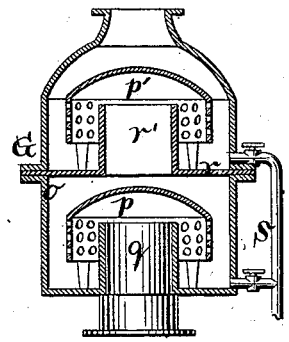

Figure 1 represents a side view of our apparatus, partly in section. Fig. 2 is a horizontal section of the vacuum-pan. Fig. 3 is a vertical central section of the condenser on a larger scale than in Fig. 1. Fig. 4 is a like section of the "overflow" used with the evaporating pan or pans.

Similar letters indicate corresponding parts.

The object of our invention is to produce an apparatus for the evaporation and crystallization of saccharine and other liquids with an economy in time, labor, and expense as compared with the apparatus now generally in use.

It consists in certain novel features in the construction of the parts of the apparatus, as hereinafter fully described, and pointed out in the claims, a preliminary description thereof being therefore deemed unnecessary.

Referring to the drawings, the letter A designates the main evaporating-pan or boiler, which is charged through a pipe, $a$, emanating from a tank, B, and which is, by preference, made of oblong shape. This main pan A is constructed with a corrugated bottom, C, whereby its heating-surface is increased, and the same is adapted to be cleaned out by means of a scraper.

In order to permit of heating the main pan A by direct fire we place the same over a furnace, D.

The letter E designates a secondary evaporating-pan, in which a vacuum is produced through the medium of a condenser hereinafter described, and which is provided with coils $b$, (one or more,) each of which is connected with the main pan A in such a manner that when the latter is put in operation the vapor escaping therefrom is received in the coils $b$, and thereby the same are heated, while by the action thereof the liquid contained in the vacuum-pan E is evaporated. The heat of the vapor escaping from the main pan A is thus utilized for working the vacuum-pan.

For the purpose of connecting the main pan A with the heating-coils $b$ of the vacuum-pan, we make use of a head or drum, F, which connects with the main pan A by a pipe, $c$, containing a stop-cock, $h$, and by an overflow, G, hereinafter described, while the heating-coils $b$ are connected to this head through the medium of stop-cocks $d$. The head F is provided with a pipe, $e$, by which it is adapted to be connected with a steam-engine, so as to receive the exhaust-steam therefrom; and the heating-coils $b$ are connected to a secondary drum or head, $H^0$, through the medium of stop-cocks $f$, which is adapted to receive live steam, so that by closing the stop-cock $h$ and admitting either exhaust or live steam, or both, to the heating-coils $b$, we are enabled to work the two pans A and E independently of each other.

The letter H designates a crystallizer, which is connected to the lower part of the vacuum-pan E by a feed-valve, $i$, and which is provided with a discharge-valve, $j$, in its lower part. In the interior of this crystallizer H is arranged a stirrer, $k$, which is geared with a driving-shaft, $l$, whereby a revolving motion can be given to the stirrer, for the purpose of detaching the crystals from the wall of the crystallizer and preventing the mass from clogging. We attach to the upper part of the crystallizer H an air-cock, $m$, and prefer to provide the same with a proof-stick of suitable form. The object of the crystallizer H is to save and accumulate the crystals formed in the vacuum-pan E, and its operation is as follows: The feed-valve $i$ is opened while the discharge-valve $j$ and air-cock $m$ are closed, whereby a communication is established between the vacuum-pan E and the crystallizer H, the latter being consequently brought under vacuum. The crystals formed in the vacuum-pan E are thus permitted to fall, by their inherent gravity, into the crystallizer H, leaving the more limpid liquid in the pan, as well as the fresh charges. When the proof-stick shows that the crystallizer H is full, the feed-valve $i$ is closed, the stirrer $k$ is revolved a few times, so as to loosen the crystals that may adhere to the side of the crystallizer, the air-cock $m$ and outlet-valve $j$ are opened, and the charge, equal to the capacity of the crystallizer, is let out. When the crystals have been discharged from the crystallizer H the discharge-valve $j$ and air-cock $m$ are then again closed and the feed-valve $i$ reopened, so as to fill the crystallizer, as before, with the crystals which in the meantime will have formed in the vacuum-pan. By this arrangement we are enabled to work the vacuum-pan E continuously.

The overflow G is fastened over the main evaporating-pan A, and its object is to deflect or condense the liquid which is taken up in globule form with the vapor escaping from the pan A, all crystallizable liquids on being evaporated being liable to be thus taken up with the vapor. The overflow G has the form of a shell, $o$, in the interior of which are arranged two (more or less) deflecting-caps, $p$, having perforated sides, the lowermost cap being supported above the bottom of the shell $o$, and being made to surround the spout $q$ of the pan A, while the next cap, when more than one is used, is supported above a diaphragm, $r$, (see Fig. 4,) and surrounds a spout, $r'$, rising from this diaphragm.

The vapor rising from the pan A comes in contact with the top part of the cap or caps $p$, and is deflected downward between the spout $r'$ or $q$ and the perforated side of the cap or caps, where it expands, whereupon the vapor passes through the perforations in the side of the cap or caps, and the globules that it may contain are broken or condensed. The liquid thus condensed runs down the side of the cap or caps and falls on the bottom of the shell $o$, whence it is returned to the pan A through a pipe, $s$.

If desired, the overflow G may be duplicated, and by its means the loss of crystallizable matter during the process of evaporation is to the greatest possible extent prevented.

The letter I designates a condenser, which receives the vapor escaping from the vacuum-pan E, and by which a vacuum is produced in this pan, the condenser being connected with the vacuum-pan through a pipe, J, and a deflector, K, and being provided with a pipe, $t$, whereby it is adapted to be connected with a vacuum-pump. The deflector K is similar in construction and operation to the deflector G, wherefore a description thereof is deemed unnecessary.

The heating-coils $b$, in the interior of the vacuum-pan E, discharge into a common head or drum L, from which emanates a pipe, $u$, leading to a pipe, $v$, which is connected at one end to the condenser I, and at the other end with a hot-water well, M, this pipe $v$ being provided with stop-cocks N O above and below the point at which the pipe $u$ is connected thereto.

Supposing the main pan A to begin to work, the vacuum-pump is set to work also, whereby the air in the heating-coils $b$ of the vacuum-pan, as well as the air in the main pan A, is exhausted, so that the latter works under vacuum, and the connecting-pipes are rendered devoid of air. On charging the vacuum-pan E also the vapor from the main pan A will communicate its heat to the liquid in the vacuum-pan through the heating-coils $b$, as before stated, and thereby the vapor is condensed. The valve N, between the outlet of the heating-coils $b$ and the condenser, is now regulated so that the vacuum in the coils corresponds to the height of the outlet from the hot-well or to its barometric column. If said valve is closed altogether the liquid in the main pan A will boil at a temperature corresponding to the atmospheric pressure.

By exhausting the air from the heating-coils $b$ we remove every impediment to the complete radiation and absorption of heat, and hence are enabled to reduce the heating-surface to a great extent, thereby producing a saving or an augmentation of work from a given quantity of steam or vapor.

If the exhaust-steam of a steam-engine be communicated to the heating-coils $b$, as before stated, this engine is converted into a low-pressure engine and its power is increased.

In the upper part of the condenser I we arrange a diaphragm, P, (best seen in Fig. 3,) which is provided with a series of concentric corrugations, $w$, the lowest portions of which are perforated, said diaphragm being also provided with a central perforated cup, $y$, into which empties a water-pipe, Q. The diaphragm P, moreover, is slightly inclined from the center outward, and to the bottom of its central cup, $y$, is secured a cap, R, from the side of which extends a pipe, $z$, which connects with the pipe $t$ of the vacuum-pump.

The water which is emptied on the diaphragm P flows from one of the corrugations $w$ to the other, and discharges into the condenser I in form of a shower, so that the vapor entering the condenser is brought intimately in contact with the water, without, however, being subjected to pressure, as is the case when the vapor is caused to traverse a sheet of water, and by this means a rapid and very effective condensation is produced.

The vapor which enters the condenser I is deflected by a plate, S, which is preferably perforated, and is secured to the inner end of the pipe J concentrically to the periphery of the condenser, but at a short distance therefrom, so that by this plate the vapor is equally distributed around the condenser, and the same is caused to trespass the shower of water before it is taken up by the vacuum-pump.

The cap R serves to prevent the withdrawal of water by the vacuum-pump, and by its location it also causes the vapor and air to be taken from the central part of the condenser I by the vacuum-pump. On arriving at the central part of the condenser I the vapor and air will be condensed and cold, and consequently the heating of the pump-pipe or of the pump itself is obviated.

The vacuum-pan E is charged from a tank, T, by a pipe, U, which tank communicates also with the main pan A through a pipe, V, which is connected with the corrugated bottom of this pan.

Apparatus for conducting the steam from one vacuum-pan through steam-heating tubes in the next vacuum-pan for heating such pan, and finally connecting the heating-tubes with the condenser, is old; so also is the use of overflows in connection with the vapor-pipes leading from vacuum-pans; and, further, we are aware that a crystallizer has been heretofore connected with a vacuum-pan for the purpose of rendering the operation of such pan continuous.

We do not, of course, claim, broadly, any of the features above enumerated.

What we claim as new, and desire to secure by Letters Patent, is—

1. The combination, with the vacuum-pan E, of a crystallizer, H, containing the agitator, substantially as described, and provided with an outlet-pipe governed by a suitable valve, whereby the vacuum-pan is rendered continuous in its operation and thorough removal of the crystals from the crystallizer effected.

2. The combination, with the vapor-escape pipe J of a vacuum-pan, of the condenser I, containing the perforated diaphragm and the centrally-arranged inverted cup having a pipe leading outwardly therefrom to the vacuum-pump, substantially as and for the purpose set forth.

3. The combination, with the vapor-escape pipe of an evaporating-pan, of an overflow vessel or chamber having an inwardly and upwardly projecting tube, above which is supported an inverted cup having perforated side walls surrounding said tube and a suitable eduction-pipe for the escape of vapor from said overflow-chamber, substantially as described.

4. The overflow chamber or vessel G, having the inwardly-projecting neck $q$, above which is supported the inverted cup $p$, diaphragm $r$, having upwardly-projecting tube $r'$, above which is supported an inverted cup, $p'$, and a suitable vapor-escape, said overflow-chamber being provided with outlet-pipes connected with the respective compartments thereof below the vapor-entrances, substantially as and for the purpose set forth.

5. The combination of the evaporating-pan A, heating-coils $b$, connected therewith and arranged in the vacuum-pan E, outlet-pipe $u$, leading from said coils and connected with the pipe $v$, having cocks O N, and leading to the condenser I and to the hot-well M, whereby a vacuum is produced in the said coils corresponding to the barometric column between the hot-well and said outlet-pipe $u$, said column being controlled by the cocks N O, substantially as set forth.

6. The combination, with the vacuum-pan E, of a condenser, I, constructed with a concentrically corrugated and perforated diaphragm, P, substantially as and for the purpose described.

7. The combination, with the vacuum-pan E, of a condenser, I, constructed with a concentrically-corrugated diaphragm, P, and a central cap, R, which is secured to the bottom of the diaphragm and communicates with the vacuum-pump, substantially as and for the purpose described.

8. The combination, with the vacuum-pan E, of a condenser, I, constructed with a concentrically corrugated and perforated diaphragm, P, central cap R, and deflecting-plate S, all operating substantially as described.

9. The combination, with the vacuum-pan E and heating-coils $b$, of an exhaust-steam drum, F, live-steam drum H, and stop-cocks $d$ $f$, all operating substantially as described.

In testimony that we claim the foregoing we have hereunto set our hands and seals this 12th day of April, 1878.

MAURICIO M. MONSANTO. [L. S.]
THOS. GANNON. [L. S.]

Witnesses:
W. HAUFF,
CHAS. WAHLERS.